United States Patent
Burns et al.

(10) Patent No.: US 7,653,701 B2
(45) Date of Patent: Jan. 26, 2010

(54) NETWORK SYSTEM AND METHOD FOR AUTOMATICALLY TRANSFERRING DATA IN A PLURALITY OF INPUT AND OUTPUT FORMATS TO A COMPUTER NETWORK

(75) Inventors: William D. Burns, Meridian, ID (US); Michael W. Jensen, Caldwell, ID (US); Loren R. Mart, Meridian, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2064 days.

(21) Appl. No.: 09/792,371

(22) Filed: Feb. 23, 2001

(65) Prior Publication Data

US 2002/0120777 A1 Aug. 29, 2002

(51) Int. Cl.
*G06F 15/16* (2006.01)
(52) U.S. Cl. .................. 709/217; 709/202; 709/203; 709/227
(58) Field of Classification Search ......... 709/200–300; 370/401, 404; 358/402, 442; 379/265
See application file for complete search history.

(56) References Cited

U.S. PATENT DOCUMENTS

| | | | | |
|---|---|---|---|---|
| 5,621,727 A * | 4/1997 | Vaudreuil | .................... | 370/401 |
| 5,633,916 A * | 5/1997 | Goldhagen et al. | ........ | 379/88.17 |
| 5,657,314 A * | 8/1997 | McClure et al. | ............. | 370/401 |
| 5,737,395 A * | 4/1998 | Irribarren | .................. | 379/88.13 |
| 5,826,034 A * | 10/1998 | Albal | ........................ | 709/239 |
| 5,881,233 A * | 3/1999 | Toyoda et al. | ............... | 709/233 |
| 5,896,504 A * | 4/1999 | Shiraki | ....................... | 709/206 |
| 5,911,776 A * | 6/1999 | Guck | ......................... | 709/217 |
| 5,974,449 A * | 10/1999 | Chang et al. | ................ | 709/206 |
| 6,023,345 A * | 2/2000 | Bloomfield | ................. | 358/402 |
| 6,031,895 A * | 2/2000 | Cohn et al. | ............... | 379/88.13 |
| 6,049,597 A * | 4/2000 | Satake et al. | ............. | 379/93.08 |
| 6,167,120 A * | 12/2000 | Kikinis | .................... | 379/90.01 |
| 6,185,604 B1 * | 2/2001 | Sekiguchi | ................... | 709/206 |
| 6,370,569 B1 * | 4/2002 | Austin | ........................ | 709/217 |
| 6,463,462 B1 * | 10/2002 | Smith et al. | ................. | 709/206 |
| 6,507,643 B1 * | 1/2003 | Groner | .................... | 379/88.14 |

(Continued)

OTHER PUBLICATIONS

Hewlett-Packard, "HP Digital Senders 8100C and 9100C E-Mail Appliances", Hewlett-Packard Company, 4 pgs. (2000).
Hewlett-Packard, "HP 9100C Digital Sender Index to Security: Version 3.0", Hewlett-Packard Company, 4 pgs.

(Continued)

*Primary Examiner*—Asad M Nawaz (57) ABSTRACT

A network device configured to be coupled to a network includes a plurality of input/output ports configured to be coupled to a plurality of input sources and receive a plurality of input data items. The network device includes an input device for entering destination information and output format information for each of the plurality of input data items. An interface bridge coupled to the plurality of input/output ports receives the plurality of input data items from the plurality of input/output ports and outputs the plurality of input data items using a single output protocol. A controller coupled to the interface bridges receives the plurality of input data items. The controller automatically converts each of the input data items to an output data item based on the entered destination and output format information, and automatically outputs the output data items to the network.

20 Claims, 3 Drawing Sheets

U.S. PATENT DOCUMENTS

| | | | | |
|---|---|---|---|---|
| 6,674,756 B1 * | 1/2004 | Rao et al. | | 370/395.21 |
| 6,701,364 B1 * | 3/2004 | Meyer | | 709/224 |
| 6,704,409 B1 * | 3/2004 | Dilip et al. | | 379/265.02 |
| 6,704,798 B1 * | 3/2004 | Mogul | | 709/246 |
| 6,721,286 B1 * | 4/2004 | Williams et al. | | 370/282 |
| 6,742,020 B1 * | 5/2004 | Dimitroff et al. | | 709/217 |
| 6,765,543 B1 * | 7/2004 | Masuda et al. | | 345/1.1 |
| 6,938,087 B1 * | 8/2005 | Abu-Samaha | | 709/227 |
| 7,080,140 B2 * | 7/2006 | Heitman et al. | | 709/224 |
| 7,379,960 B2 * | 5/2008 | Dimitroff et al. | | 709/202 |
| 7,457,846 B2 * | 11/2008 | Baldwin et al. | | 709/217 |
| 7,590,759 B2 * | 9/2009 | Omar et al. | | 709/246 |
| 2002/0059401 A1 * | 5/2002 | Austin | | 709/219 |
| 2002/0112076 A1 * | 8/2002 | Rueda et al. | | 709/245 |

OTHER PUBLICATIONS

Hewlett Packard, "Index to Architecture—of the HP 9100C Digital Sender: Version 4.1", Hewlett-Packard Company, 8 pgs.

Hewlett-Packard, "HP 9100C Digital Sender Index to Configuration Help: Version 4.0", Hewlett-Packard Company, 4 pgs.

Hewlett Packard, "HP 9100C Digital Sender Index to Demo Installation: Version 4.0", Hewlett-Packard Company, 4 pgs.

Hewlett Packard, "HP 9100C Digital Sender Index to Internet E-mail: Version 4.2", Hewlett-Packard Company, 5 pgs.

Hewlett-Packard, "HP 9100C Digital Sender User Guide", Hewlett-Packard Company, pp. 1-147.

Hewlett-Packard, "HP 9100C Digital Sender Administrator Guide", Hewlett-Packard Company, pp. 1-227.

* cited by examiner

NETWORK SYSTEM AND METHOD FOR AUTOMATICALLY TRANSFERRING DATA IN A PLURALITY OF INPUT AND OUTPUT FORMATS TO A COMPUTER NETWORK

THE FIELD OF THE INVENTION

The present invention generally relates to computer networks, and more particularly to a network device for receiving input data items in a plurality of formats and automatically transferring the input data items to a computer network.

BACKGROUND OF THE INVENTION

Currently, there are limited options for transferring information to a network such as the Internet. One option is to couple a personal computer (PC) to the network. Numerous internal or external devices may be connected to the PC, such as disk drives, CD-ROM drives and scanners, allowing data with different data formats from different media to be input into the PC. Typically, numerous software applications are associated with each device connected to the PC, making the process of entering data from each device into the PC complex, with numerous steps required to enter the data and have it transmitted to the network. For example, to send a document via e-mail using a PC, the document typically has to be scanned using a first software application, and then stored in a file on the PC. An e-mail application then has to be opened up, and the stored file has to be attached to a new e-mail message. The PC must then connect to an exchange server before the e-mail message with the attached file is finally transmitted.

In addition to using a PC for transferring data to a network, another option for transferring information to a network is a "digital sender". Hewlett-Packard Company makes a couple of different models of digital senders. Information regarding Hewlett-Packard digital senders is publicly available via Hewlett-Packard's website at www.hp.com. Information regarding Hewlett-Packard's digital senders is also provided in "HP 9100C Digital Sender User Guide," $1^{st}$ ed., 1998, Pub. No. C1311-90910, and "HP 9100C Digital Sender Administrator Guide," $1^{st}$ ed., 1998, Pub. No. C1311-90915, which are hereby incorporated by reference.

A digital sender is a network device that converts paper-based documents into electronic data. A digital sender includes a scanner for scanning in paper documents. The digital sender can send the electronic data by several methods, including via Internet e-mail, via facsimile (Fax) either through a network fax server or an Internet fax service provider, and via "JetSend" to other JetSend enabled network devices. JetSend is a Hewlett-Packard communications technology built into some printer and scanner firmware and computer software. JetSend enabled devices can connect, "talk" to each other, and exchange information directly through the network. The JetSend capability is independent of servers and programs, and uses simple addressing such as TCP/IP addresses and host names.

A digital sender allows data to be transferred to the Internet with fewer steps than that required by a PC. The digital sender includes a keypad that allows a user to enter an e-mail address. A user can scan in a document, enter one or more e-mail addresses for the desired destinations, press a send button, and the digital sender automatically e-mails the information to the various destinations. The digital sender automatically logs onto an exchange server, and transmits an e-mail message with the scanned document attached, without any further user input required. Thus, a digital sender provides a more efficient means for transferring paper-based source information to the Internet.

It would be desirable for a single network device to provide an "on-ramp" onto a network for all types of data and content, regardless of the scope or format of the data, or the type of input media, and without requiring numerous manual steps as in prior art methods.

SUMMARY OF THE INVENTION

The present invention provides a device and method for automatically transferring data received in a plurality of input formats from a plurality of input sources to a computer network in a plurality of output formats without requiring a user to input the data into a personal computer. A network device configured to be coupled to a network having an e-mail server receives a plurality of input data items from a plurality of input sources in a plurality of input formats. The network device outputs a plurality of output data items in a plurality of output formats to the network. The network device includes a plurality of input/output ports configured to be coupled to the plurality of input sources. The plurality of input data items are received by the network device through the plurality of input/output ports. The network device includes an input device for entering destination information and output format information for each of the plurality of input data items. An interface bridge is coupled to the plurality of input/output ports. The interface bridge receives the plurality of input data items from the plurality of input/output ports and outputs the plurality of input data items using a single output protocol. A controller is coupled to the interface bridge. The controller receives the plurality of input data items from the interface bridge. The controller automatically converts each of the input data items to an output data item based on the entered destination and output format information, and automatically outputs the output data items to the network.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
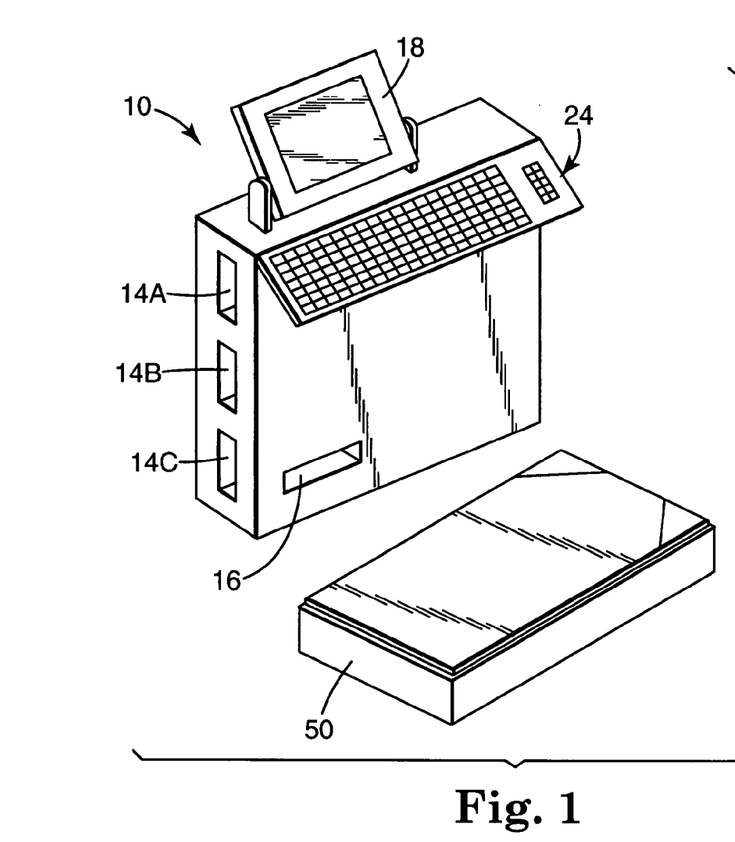
FIG. 1 illustrates a first perspective view of a network on-ramp device according to the present invention.
Figure 2:
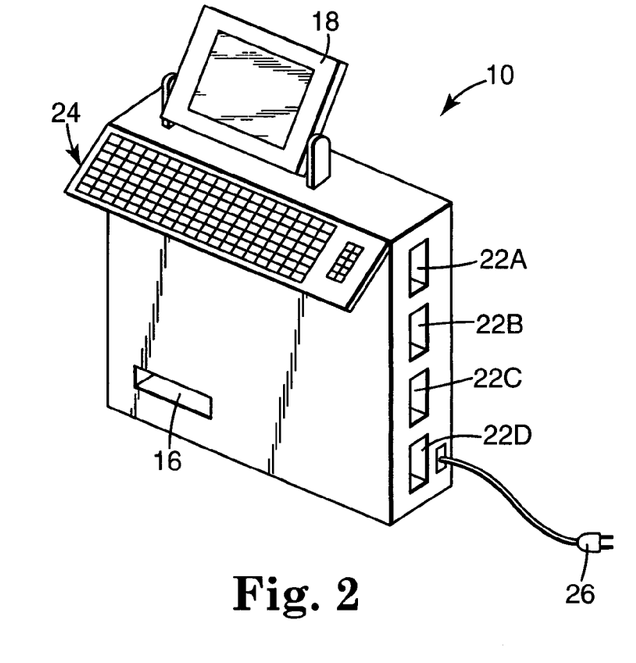
FIG. 2 illustrates a second perspective view of a network on-ramp device according to the present invention.

FIGS. 1 and 2 illustrate perspective views of a network on-ramp device according to the present invention. Network on-ramp device 10 includes display 18, keyboard 24, input/output (I/O) ports 14A-14C (collectively referred to as I/O ports 14), SCSI docking port 16, network ports 22A-22D (collectively referred to as network ports 22), and power cord 26. On-ramp device 10 does not require a PC to connect to a network, but rather hooks directly into a network via one of network ports 22.

In one embodiment, I/O ports 14 and network ports 22 are plug-in modules that may be inserted in or removed from on-ramp device 10. By using plug-in modules for I/O ports 14, all types of input devices, whether currently existing or to be developed, may be easily coupled to on-ramp device 10, regardless of the input/output port type used by the input device. By using plug-in or removable modules for network ports 22, many different types of network connections can be made. In one embodiment, SCSI docking port 16 is also a plug-in module.

FIG. 1 also shows input device 50, which is a flatbed scanner in the embodiment shown. Input device 50 is preferably any type of device that can transmit and/or receive electronic data to and from network on-ramp device 10, including a floppy disk drive, digital camera, personal digital assistant (PDA) device, smart card reader, memory card reader, scanner, microphone, printer, or other input device. In one embodiment, input device 50 is coupled to on-ramp device 10 via SCSI docking port 16. In other embodiments, input device 50 is coupled to on-ramp device 10 via one of I/O ports 14. Multiple input devices 50 may be connected to network on-ramp device 10 at the same time. On-ramp device 10 accepts full media, including voice data, image data, personal digital assistant (PDA) data, or any other type of data from virtually any type of input source device 50.

I/O ports 14 preferably include one or more of the following types of ports: IR port, IEEE 1394 port, USB port, serial port, Centronics port, ATA port, and an IDE port. Other I/O ports 14 may also be used. I/O ports 14 are capable of communicating in multiple protocols, including IEEE 1394 (firewire), IEEE 802.11, and JetSend. Other protocols may also be used. IEEE 802.11 and Jetsend are both protocols for infrared communications. Network ports 22 include one or more of the following types of ports: Phone port, coaxial cable port, IR port, and an RF port. Network ports 22 are capable of communicating in multiple protocols, including TCP/IP, Ethernet, and token ring. Other protocols may be used.

Data is entered into on-ramp device 10 by a user via keyboard 24. Data is displayed by on-ramp device 10 via screen 18. Alternative methods of data entry and display may be used, including a touch screen display. Power is supplied to on-ramp device 10 via power cord 26.

Figure 3:
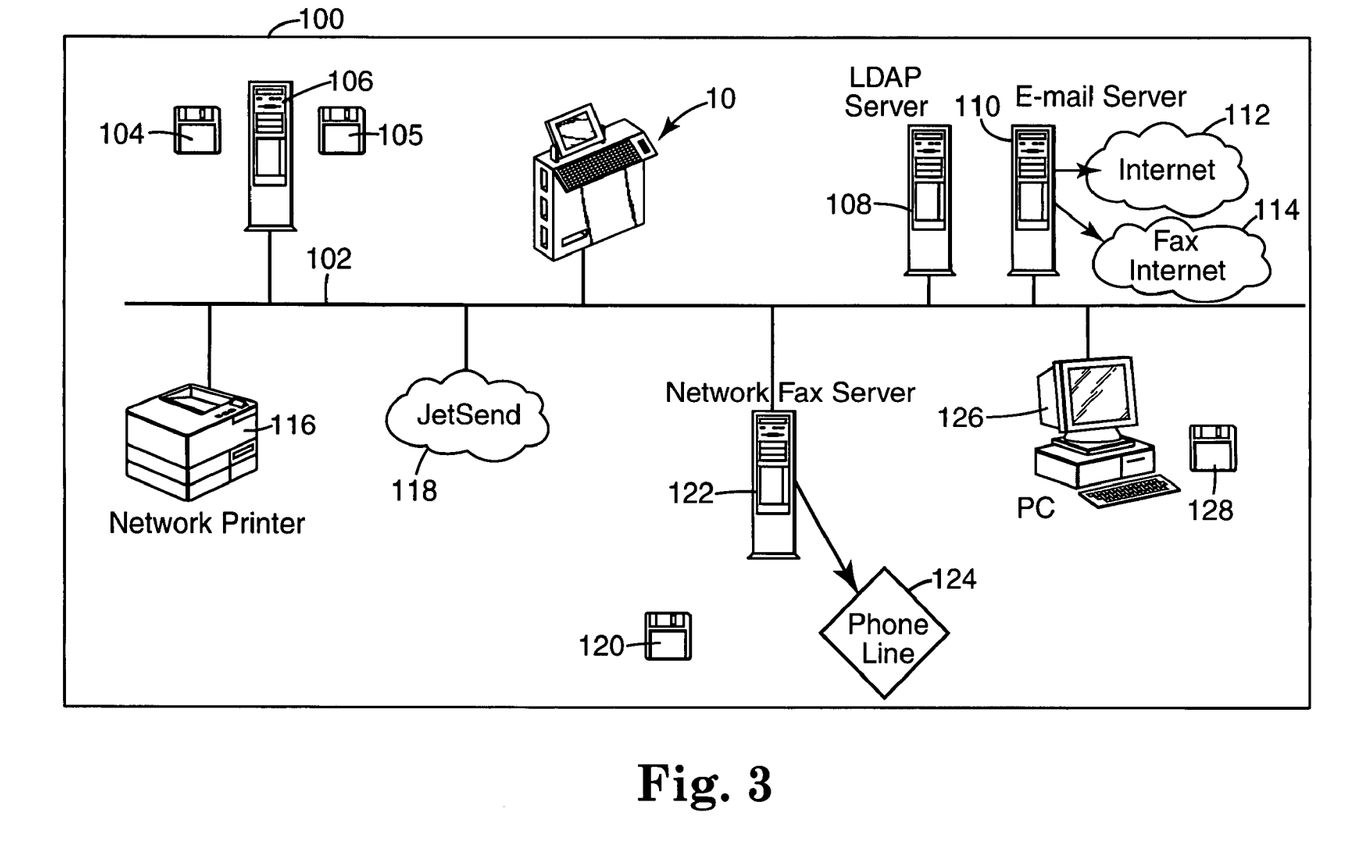
FIG. 3 illustrates a diagram of a network, including a network on-ramp device according to the present invention.

FIG. 3 illustrates a diagram of a network including a network on-ramp device according to the present invention. Network 100 includes communication line 102, on-ramp software 104, third-party application software 105, computer 106, on-ramp device 10, light-weight directory access protocol (LDAP) server 108, e-mail server 110, Internet 112, Internet fax service provider 114, network printer 116, JetSend device 118, fax server software 120, computer 122, phone line 124, computer 126 and link software 128. Computers 106 and 122 are preferably servers running on-ramp software 104. Computer 126 is preferably a PC running on-ramp software 104 and link software 128. E-mail server 110 preferably supports simple mail transport protocol (SMTP). In one embodiment, a permanent TCP/IP network connection exists between network on-ramp device 10 and e-mail server 110. Software for performing the functions provided by on-ramp software 104, fax server software 120 and link software 128 are commercially available, or are within the skill of one of ordinary skill in the art to develop. These functions are discussed below.

In one embodiment, network on-ramp device 10 is not server-based, which allows easier installation and configuration. Network on-ramp device 10 operates as a standalone unit on network 100 and does not require network privileges to administer. Network on-ramp device 10 is network operating system (NOS) independent. Network on-ramp device 10 runs on any TCP-IP network, including Ethernet (10Base-T, 100Base-T or 10Base-2) or token ring. Network on-ramp device 10 is coupled to network 100 via one of network ports 22. An appropriate network port module 22 is inserted into network on-ramp device 10 based on the type of network configuration (e.g., Ethernet or token ring). Network 100 is discussed in further detail below.

Figure 4:
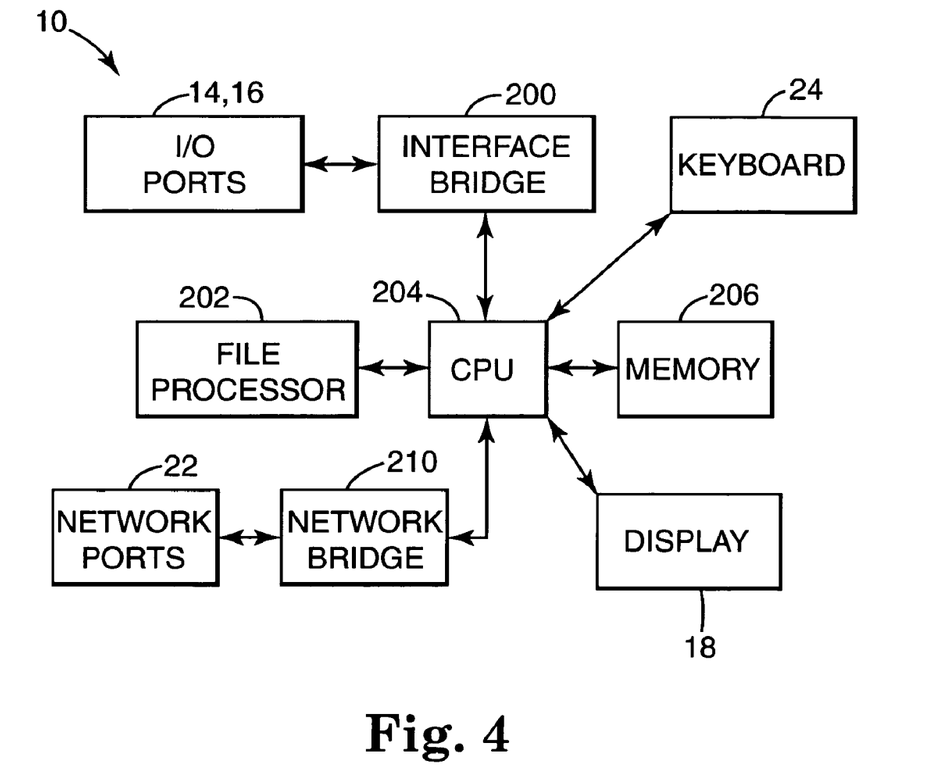
FIG. 4 illustrates an electrical block diagram of a network on-ramp device according to the present invention.

FIG. 4 illustrates an electrical block diagram of network on-ramp device 10. Network on-ramp device 10 includes I/O ports 14 and 16, interface bridge 200, keyboard 24, file processor 202, CPU 204, memory 206, network ports 22, network bridge 210, and display 18.

The operation of I/O ports 14 and 16 was discussed above with reference to FIGS. 1 and 2. Interface bridge 200 is a standard network device that communicates with I/O ports 14 and 16, and CPU 204. I/O ports 14 and 16 use a variety of communication protocols. Interface bridge 200 converts the communications from I/O ports 14 and 16 to a single protocol for use by CPU 204. Interface bridge 200 also converts communications received from CPU 204 to an appropriate protocol for the desired one of I/O ports 14 and 16.

An input data item to be transferred to network 100 is provided to on-ramp device 10 from an input device 50 coupled to one of I/O ports 14 or 16. The input data item is received by interface bridge 200 and passed on to CPU 204, which stores the input data item in memory 206. Memory 206 also stores on-ramp software 104 for operation of on-ramp device 10. CPU 204 may also include its own on-board memory. Memory 206 preferably includes both nonvolatile memory, such as ROM, PROM, EEPROM or other non-volatile memory, and temporary or volatile memory such as RAM.

Destination information and output format information for input data items are entered by a user via keyboard 24. The user may also enter sender information identifying the sender, such as a name or e-mail address, and subject information identifying a subject of input data items. Based on the destination information and output format information entered by a user, file processor 202 performs appropriate conversions on an input data item and generates an output data item.

File processor 202 performs various processing tasks on input data items. File processor 202 processes many different file types, including HTML, MOV, AVI, MPEG, PDF, MP3, JPEG, MTIFF, WAV, ZIP, e-mail, as well as other file types, and includes the capability to convert file types to other file types. The functions performed by file processor 202 are controlled by CPU 204 based on destination information and output format information provided by a user via keyboard 24. Functions performed by file processor 202 include file compression/decompression, formatting a file for the web, passing a file through unchanged, generating an e-mail with an input data item added as an attachment, converting an input text communication to a fax communication, converting an input speech communication to a text document, formatting text for printing, as well as other processing functions. Software and hardware for performing the functions provided by file processor 202 are commercially available, or are within the skill of one of ordinary skill in the art to develop.

Network bridge 210 is a standard network device that converts data received from CPU 204 to an appropriate protocol for a selected one of the network ports 22. In one embodiment, network bridge 210 uses TCP/IP in addition to either an Ethernet or token ring protocol. Network bridge 210 also converts data received from network ports 22 to an appropriate protocol for CPU 204.

CPU 204 outputs output data items generated by file processor 202 to network bridge 210. Network bridge 210 outputs the output data items to one of network ports 22, for transfer of the output data items to one or more destinations on network 100. In one embodiment, the destinations for an output data item include an Internet e-mail address, a fax phone number, a computer on the network, a printer on the network, a JetSend device, a software program installed on a computer on the network, and a device coupled to network on-ramp device 10 via one of I/O ports 14 and 16. Each of these types of destinations are discussed below. The destination information entered by a user may specify multiple destinations for input data items.

In one embodiment, an output data item generated by file processor 202 takes the form of an e-mail message. An e-mail message generated by file processor 202 preferably includes two parts. The first part is a header, which contains sender and destination information. The second part is a digitized document attachment. File processor 202 generates the digitized document by converting an input data item into a document format, such as PDF or TIFF format. The type of document format is specified in the output format information entered by a user. The types of conversions that are performed by file processor 202 depend upon the format of the input data item and the output format information entered by a user. For example, if the input data item is a voice communication and the output format information indicates that the input data item is to be transmitted over the network as a PDF attachment to an e-mail message, the voice communication is converted into a text document. The text document is then converted into a PDF file. The PDF file is attached to an e-mail message by file processor 202. File processor 202 preferably uses multipart Internet message encoding (MIME) to encode e-mail messages.

Keyboard 24 of network on-ramp device 10 allows any e-mail address to be typed in, or selected and retrieved from an internal address book stored in memory 206 of network on-ramp device 10. In addition, network on-ramp device 10 also supports LDAP queries, which provides the ability of real-time address queries. The LDAP capabilities are provided by LDAP server 108 (shown in FIG. 3).

Network on-ramp device 10 includes the capability to send faxes. In order to provide fax capabilities, computer 122 (shown in FIG. 3) includes fax server software 120. Computer 122 also includes phone line 124 to transmit faxes received from network on-ramp device 10. Network on-ramp device 10 sends digitized documents via communication line 102 to computer 122, which handles outbound dialing to transmit the documents over phone line 124. Again, the digitized documents are generated by file processor 202 by converting an input data item, regardless of the format, into a document format. Fax numbers may be entered through keyboard 24 on network on-ramp device 10, or they can be retrieved from an internal fax address book stored memory 206.

Network on-ramp device 10 is also capable of sending faxes via the Internet. To provide Internet fax capabilities, the user must subscribe to an Internet fax service provider service. As shown in FIG. 3, e-mail server 110 provides Internet fax capabilities using Internet fax service provider 114. In order to transmit a document via Internet fax, file processor 202 first converts an input data item into a document format. Network on-ramp device 10 transmits the document via communication line 102 to e-mail server 110, which handles the Internet fax transmission.

Network on-ramp device 10 communicates with any "JetSend" enabled device reachable through a known IP address on network 100. File processor 202 converts an input data item to an output data item based on destination information and output file format information entered by a user. The output data item is then transmitted from on-ramp device 10 to JetSend device 118 via communication line 102 of network 100.

Network on-ramp device 10 includes the capability to send documents back to a user's PC 126 (shown in FIG. 3) or other PC, for further manipulation or archiving of the documents. Such documents are sent directly from network on-ramp device 10, with point-to-point TCP/IP communication between the network on-ramp device 10 and the destination PC 126. This process is accomplished through peer-to-peer transmission. In one embodiment, addresses of destination computers are predefined in registered user profiles stored in memory 206. Users enter such profiles in on-ramp device 10 through keyboard 24. In order to provide the capability to transmit documents to a PC 126, the PC 126 runs link software 128. In one embodiment, link software 128 is a software driver that shows a tray icon on the windows task bar, and which enables PC 126 to receive data from network on-ramp device 10. The documents sent to PC 126 are received in the tray as PDF or TIFF files, although other formats may be used.

If a desktop application is installed on PC 126, such as Adobe Circulate, the application is executed automatically by link software 128 each time a new document arrives in the tray, and the document is automatically routed to the opened application. Adobe Circulate may be used to receive, store, view, organize, distribute and manipulate documents. Link software 128 preferably includes a control panel applet that allows a user to provide settings for the program, such as where to store scanned documents until they are opened in a program on the computer. The storage location is known as the default inbox location, and the program in which the documents are opened is known as the target program. From the control panel applet, a user can set which program is the target program. In one embodiment, the target program can be either the Adobe Circulate program or another program capable of accepting PDF or multipage TIFF files.

Network on-ramp device 10 includes a "copy" feature, which allows direct point-to-point communication with network printer 116 (shown in FIG. 3), to print out copies of an input data item. File processor 202 converts an input data item into printing data in an appropriate printing control language for network printer 116. The printing data is then output by on-ramp device 10 to network printer 116 via communication line 102 of network 100. A user selects a printer to "copy" to from keyboard 24 on network on-ramp device 10.

Network on-ramp device 10 also includes the capability to transfer documents to a specific "network share". A network share is defined as the network address of a computer 106 (shown in FIG. 3) running on-ramp software 104, plus a path to a directory on that computer 106. A document transferred to a network share can easily be imported into a third-party application 105. On-ramp software 104 handles the receipt of documents transmitted from on-ramp device 10, and provides the ability to automatically import the documents into a specified third-party application 105. Using this capability, input data items may be transmitted directly to a specified web page. File processor 202 converts an input data item to an output data item appropriate for a specified network share based on destination information and output format information entered by a user. The destination information specifies one or more particular network shares. A document transmitted from network on-ramp device 10 to computer 106 is preferably delivered as a PDF or TIFF file, although other formats may be used.

In addition to specifying destinations on network 100, destination information entered by a user may also specify a device 50 coupled to on-ramp device 10 via one of I/O ports 14 and 16. For such destinations, file processor 202 converts an input data item to an output data item based on entered destination and output format information, and then outputs the output data item to interface bridge 200. Interface bridge 200 outputs the output data item to the I/O port 14 or 16 coupled to the specified device 50 using an appropriate communication protocol.

It will be understood by a person of ordinary skill in the art that functions performed by on-ramp device 10 may be implement in hardware, software, firmware, or any combination thereof. It will also be understood that on-ramp device 10 may easily be modified to work with communication protocols, file types, and data formats, other than the specific examples provided, whether currently existing or to be developed. In one embodiment, on-ramp device 10 is always on, and always ready to transfer data to a network, and provides a means for simply and efficiently transferring input data items in a variety of input formats to a variety of destinations in a variety of output formats.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A network device configured to be coupled to a network, the network device comprising:
   a plurality of input/output ports configured to be coupled directly to a plurality of input source devices proximate to the network device and receive a plurality of input data items from the input source devices;
   an input device distinct from the input source devices for entering destination information and output format information for each of the plurality of input data items;
   an interface bridge coupled to the plurality of input/output ports, the interface bridge receiving the plurality of input data items from the plurality of input/output ports and outputting the plurality of input data items using a single output protocol; and
   a controller coupled to the interface bridge, the controller receiving the plurality of input data items from the interface bridge, the controller automatically converting each of the input data items to an output data item based on the entered destination and output format information, and automatically outputting the output data items to the network.

2. The network device of claim 1, and further comprising a permanent network connection to an e-mail server of the network.

3. The network device of claim 1, wherein the plurality of input data items received by the network device through the plurality of input/output ports are received using a plurality of input communication protocols.

4. The network device of claim 1, wherein the network device outputs the plurality of output data items in a plurality of output formats to the network using an Internet protocol.

5. The network device of claim 1, wherein at least one of the plurality of input/output ports is a removable module.

6. The network device of claim 4, and further comprising a network bridge coupled to the controller, and at least one network port coupled to the network bridge and the network, the network bridge configured to receive the plurality of output data items from the controller and output the plurality of output data items to the network port using a network communication protocol and the Internet protocol.

7. The network device of claim 6, wherein the network port is a removable module.

8. The network device of claim 1, wherein the plurality of output data items are in a plurality of output file formats.

9. The network device of claim 1, and further comprising a plurality of network ports.

10. The network device of claim 9, wherein at least one of the plurality of network ports is a removable module.

11. The network device of claim 9, and further comprising a network bridge coupled to the controller and the plurality of network ports, the network bridge configured to output the plurality of output data items to a selected one of the network ports using a selected one of a plurality of network communication protocols and an Internet protocol.

12. The network device of claim 1, wherein the network further comprises an internet fax server, and wherein a first one of the output data items is in a format compatible with the internet fax server for internet fax transmission of the first output data item, the controller automatically outputting the first output data item to the internet fax server over the network.

13. The network device of claim 1, wherein the network further comprises a first computer configured to transmit fax communications via a telephone line, and wherein a first one of the output data items is in a format compatible with the first computer for telephone fax transmission of the first output data item, the controller automatically outputting the first output data item to the first computer over the network.

14. The network device of claim 1, wherein a first one of the output data items is an e-mail communication with a first one of the input data items included as an attachment to the e-mail communication, the controller automatically outputting the e-mail communication to the e-mail server ova the network.

15. The network device of claim 1, wherein the network further comprises a JetSend enabled device, and wherein a first one of the output data items is in a format compatible with the JetSend enabled device, the controller automatically outputting the first output data item to the JetSend enabled device over the network.

16. The network device of claim 1, wherein the network further comprises a network printer, and wherein a first one of the output data items is in a format compatible with the network printer, the controller automatically outputting the first output data item to the network printer over the network.

17. The network device of claim 1, wherein the network further comprises a first computer running a first software application, and wherein a first one of the output data items is in a format compatible with the first software application, the controller automatically outputting the first output data item to the first computer over the network for automatic import into the first software application.

18. A method of automatically transferring data to a computer network with a network device without requiring a user to input the data into a personal computer, the method comprising:

providing a plurality of input/output ports in the network device, the plurality of input/output ports configured to be coupled to a plurality of input sources;

receiving input data items through each of the input/output ports from each of the plurality of input sources;

receiving destination information for each of the input data items from an input device of the network device;

receiving output format information for each of the input data items from the input device of the network device;

automatically converting each of the input data items to output data items with the network device based on the received output format information and destination information; and  automatically outputting the output data items from the network device to the network.

19. The method recited in claim 18, and further comprising providing a permanent network connection between the network device and an e-mail server of the computer network.

20. A network device configured to be coupled to a network, the network device comprising:

a plurality of input/output ports configured to be directly coupled to a plurality of input sources to receive a plurality of input data items;

an input device for entering destination information and output format information for each of the plurality of input data items;

an interface bridge coupled to the plurality of input/output ports, the interface bridge receiving the plurality of input data items from the plurality of input/output ports;

a controller coupled to the interface bridge, the controller receiving the plurality of input data items from the interface bridge, the controller automatically converting each of the input data items to an output data item based on the entered destination and output format information;

a network bridge coupled to the controller; and a network port coupled to the network bridge and to the network, the network bridge receiving the plurality of output data items from the controller, the network bridge outputting the plurality of output data items to the network through the network port.

\* \* \* \* \*

UNITED STATES PATENT AND TRADEMARK OFFICE
CERTIFICATE OF CORRECTION

PATENT NO. : 7,653,701 B2  Page 1 of 1
APPLICATION NO. : 09/792371
DATED : January 26, 2010
INVENTOR(S) : William D. Burns et al.

It is certified that error appears in the above-identified patent and that said Letters Patent is hereby corrected as shown below:

In column 8, line 52, in Claim 14, delete "ova" and insert -- over --, therefor.

Signed and Sealed this

Thirty-first Day of August, 2010

David J. Kappos
*Director of the United States Patent and Trademark Office*